United States Patent
Sato

(10) Patent No.: US 9,917,956 B2
(45) Date of Patent: *Mar. 13, 2018

(54) IMAGE PROCESSING APPARATUS, IMAGE PROCESSING SYSTEM, AND COMPUTER READABLE MEDIUM THEREFOR

(71) Applicant: BROTHER KOGYO KABUSHIKI KAISHA, Nagoya-shi, Aichi-ken (JP)

(72) Inventor: Hirokazu Sato, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/067,513

(22) Filed: Mar. 11, 2016

(65) Prior Publication Data
US 2016/0198050 A1 Jul. 7, 2016

Related U.S. Application Data

(63) Continuation of application No. 13/829,635, filed on Mar. 14, 2013, now Pat. No. 9,286,019.

(30) Foreign Application Priority Data

Mar. 30, 2012 (JP) .................................. 2012-082820

(51) Int. Cl.
  *G06F 3/12* (2006.01)
  *H04N 1/00* (2006.01)
  *H04N 1/32* (2006.01)

(52) U.S. Cl.
  CPC ....... *H04N 1/00106* (2013.01); *G06F 3/1204* (2013.01); *G06F 3/1236* (2013.01);
  (Continued)

(58) Field of Classification Search
  CPC .......... H04N 1/00106; H04N 1/00411; H04N 1/001; H04N 1/00413; H04N 1/00307; H04N 2201/006; H04N 2201/0094
  (Continued)

(56) References Cited

U.S. PATENT DOCUMENTS

2008/0074713 A1   3/2008  Nakawaki
2009/0036056 A1*  2/2009  Oshima ............... H04M 1/7253
                                                    455/41.3
(Continued)

FOREIGN PATENT DOCUMENTS

JP   2008-079151 A   4/2008

*Primary Examiner* — Kent Yip
(74) *Attorney, Agent, or Firm* — Merchant & Gould P.C.

(57) ABSTRACT

An image processing apparatus is provided that includes a controller configured to control a communication device to transmit, to an information processing terminal device, image processing information indicating a specific one of image processing operations that has been selected at a time when the controller starts establishment of communication with the information processing terminal device, control the communication device to receive execution instructing information from the information processing terminal device, and control a specific one of image processing executing devices that corresponds to the received execution instructing information to execute the specific image processing operation in accordance with the received execution instructing information.

8 Claims, 12 Drawing Sheets

(52) U.S. Cl.
CPC .......... *G06F 3/1292* (2013.01); *G06F 3/1297* (2013.01); *H04N 1/001* (2013.01); *H04N 1/00307* (2013.01); *H04N 1/00411* (2013.01); *H04N 1/00413* (2013.01); *H04N 1/32106* (2013.01); *H04N 2201/006* (2013.01); *H04N 2201/0041* (2013.01); *H04N 2201/0094* (2013.01); *H04N 2201/3222* (2013.01); *H04N 2201/3278* (2013.01)

(58) Field of Classification Search
USPC .............................................. 358/1.15, 1.16
See application file for complete search history.

(56) References Cited

U.S. PATENT DOCUMENTS

| | | |
|---|---|---|
| 2009/0103124 A1 | 4/2009 | Kimura et al. |
| 2010/0069008 A1 | 3/2010 | Oshima et al. |
| 2011/0043857 A1 | 2/2011 | Hiroki |
| 2011/0157638 A1 | 6/2011 | Yamada |
| 2012/0311019 A1* | 12/2012 | Raman ............... G06Q 20/3278 709/203 |
| 2013/0258382 A1 | 10/2013 | Sato |

\* cited by examiner

IMAGE PROCESSING APPARATUS, IMAGE PROCESSING SYSTEM, AND COMPUTER READABLE MEDIUM THEREFOR

CROSS-REFERENCE TO RELATED APPLICATION

This application is a continuation of U.S. patent application Ser. No. 13/829,635 filed Mar. 14, 2013, and further claims priority under 35 U.S.C. § 119 from Japanese Patent Application No. 2012-082820 filed on Mar. 30, 2012. The entire subject matter of the both of which are incorporated herein by reference in their entirety.

BACKGROUND

Technical Field

The following description relates to one or more techniques to allow a user to operate in an intuitive manner an image processing system that includes an image processing apparatus and an information processing terminal device.

Related Art

A multi-function peripheral having an IC chip reader has been known. The known multi-function peripheral is configured to, when a document sheet with a non-contact IC chip embedded therein is set, read out document type information from the non-contact IC chip, using the IC chip reader. Further, the known multi-function peripheral is configured to search for and retrieve an application corresponding to the document type information and launch the retrieved application.

SUMMARY

A technique has been known that is configured to establish wireless communication (e.g., near field communication (NFC) and wireless LAN) between an information processing terminal device (e.g., a mobile phone and a notebook computer) and an image processing apparatus (e.g., a multi-function peripheral) and to perform data communication therebetween. Further, the image processing apparatus may have a plurality of functions such as a scanning function, a facsimile function, and a printing function. In this case, in order to perform data communication between the image processing apparatus and the information processing terminal device, the information processing terminal device may have to be operated in response to a function in execution on the image processing apparatus. Hence, a user may need to perform various operations such as identifying the function in execution on the image processing apparatus and selecting an application to be executed on the information processing terminal device. Thus, the known technique requiring such operations is not necessarily user-friendly.

Aspects of the present invention are advantageous to provide one or more improved techniques for overcoming the aforementioned inconveniences of the known technique.

According to aspects of the present invention, an image processing apparatus is provided that includes a plurality of image processing executing devices each configured to execute a corresponding one of a plurality of image processing operations, a selection accepting device configured to accept a selection of a specific one, of the plurality of image processing operations, to be executed, a communication device configured to communicate with an information processing terminal device, and a controller configured to control the communication device to transmit, to the information processing terminal device, image processing information indicating the specific image processing operation specified by the selection that has been accepted by the selection accepting device at a time when the controller starts establishment of communication with the information processing terminal device, control the communication device to receive, from the information processing terminal device, execution instructing information for instructing the image processing apparatus to execute the specific image processing operation indicated by the image processing information, and control a specific one of the plurality of image processing executing devices that corresponds to the received execution instructing information to execute the specific image processing operation in accordance with the received execution instructing information.

According to aspects of the present invention, further provided is an image processing system that includes an image processing apparatus, and an information processing terminal device, the image processing apparatus including a plurality of image processing executing devices each configured to execute a corresponding one of a plurality of image processing operations, a selection accepting device configured to accept a selection of a specific one, of the plurality of image processing operations, to be executed, a communication device configured to communicate with an information processing terminal device, and a controller configured to control the communication device to transmit, to the information processing terminal device, image processing information indicating the specific image processing operation specified by the selection that has been accepted by the selection accepting device at a time when the controller starts establishment of communication with the information processing terminal device, control the communication device to receive, from the information processing terminal device, execution instructing information for instructing the image processing apparatus to execute the specific image processing operation indicated by the image processing information, and control a specific one of the plurality of image processing executing devices that corresponds to the received execution instructing information to execute the specific image processing operation in accordance with the received execution instructing information, the information processing terminal device including a terminal-side communication device configured to communicate with the image processing apparatus, and a terminal-side controller configured to control the terminal-side communication device to receive, from the image processing apparatus, the image processing information indicating the specific image processing operation that has been selected on the image processing apparatus at a time when the terminal-side controller starts establishment of communication with the image processing apparatus, activate a specific one of a plurality of acceptors that corresponds to the received image processing information, the plurality of acceptors each configured to accept execution instructing information for instructing the image processing apparatus to execute a corresponding one of the plurality of image processing operations, control the specific acceptor to accept the execution instructing information for instructing the image processing apparatus to execute the specific image processing operation indicated by the received image processing information, and control the terminal-side communication device to transmit, to the image processing apparatus, the execution instructing information for instructing the image processing apparatus to execute the specific image processing operation.

According to aspects of the present invention, further provided is a non-transitory computer readable medium storing computer readable instructions configured to, when executed on a computer, cause the computer to establish communication with an image processing apparatus configured to execute a plurality of image processing operations, receive, from the image processing apparatus, image processing information indicating a specific one of the plurality of image processing operations that has been selected on the image processing apparatus at a time when the computer starts establishing the communication with the image processing apparatus, activate a specific one of a plurality of acceptors that corresponds to the received image processing information, the plurality of acceptors each configured to accept execution instructing information for instructing the image processing apparatus to execute a corresponding one of the plurality of image processing operations, and accept, via the specific acceptor, execution instructing information for instructing the image processing apparatus to execute the specific image processing operation indicated by the received image processing information.

BRIEF DESCRIPTION OF THE ACCOMPANYING DRAWINGS

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented on circuits (such as application specific integrated circuits) or in computer software as programs storable on computer readable media including but not limited to RAMs, ROMs, flash memories, EEPROMs, CD-media, DVD-media, temporary storage, hard disk drives, floppy drives, permanent storage, and the like.

Hereinafter, an embodiment according to aspects of the present invention will be described with reference to the accompanying drawings.

<Configuration of Communication System>

Figure 1:
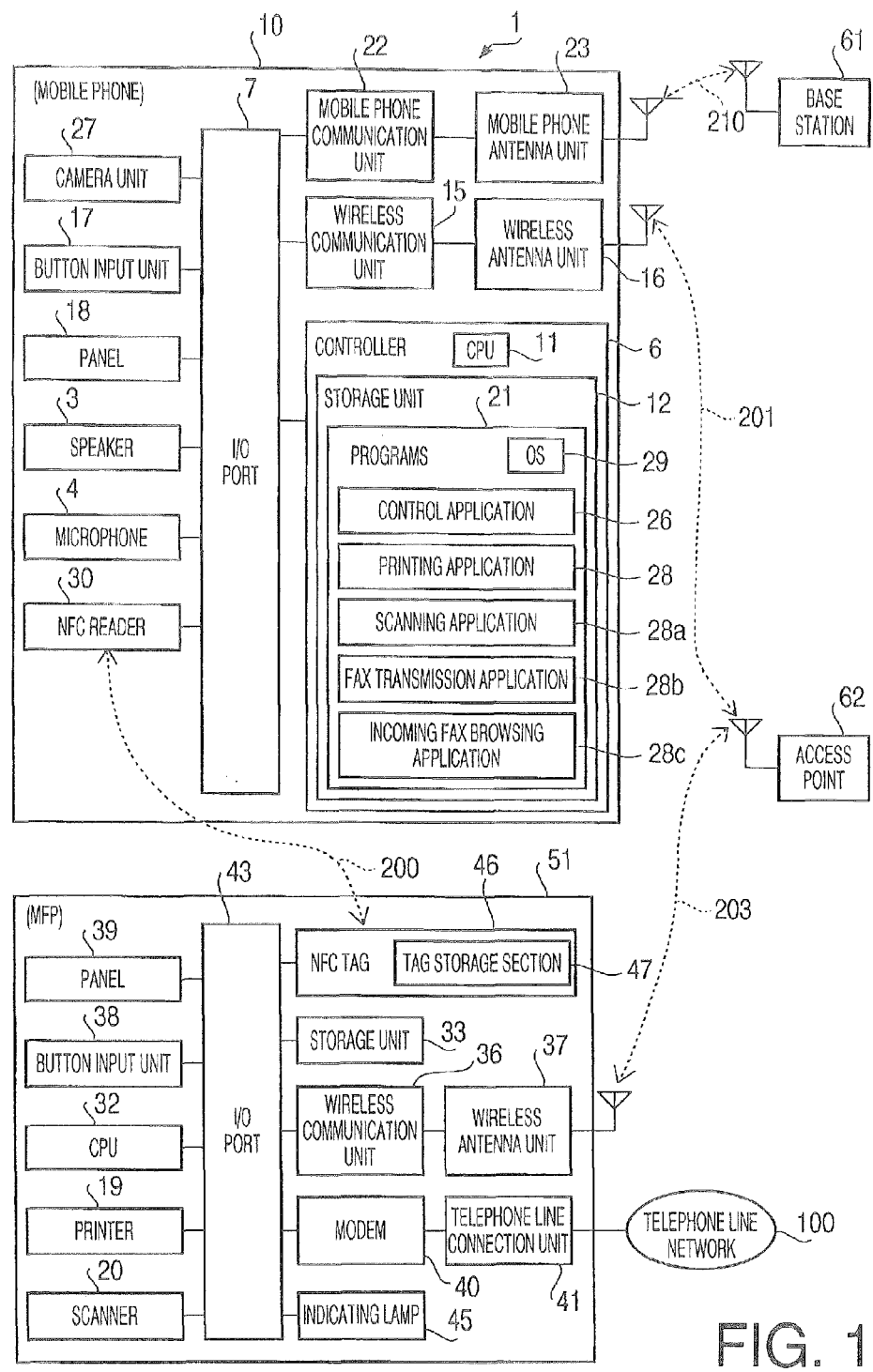
FIG. 1 is a block diagram of a communication system in an embodiment according to one or more aspects of the present invention.
Figure 2:
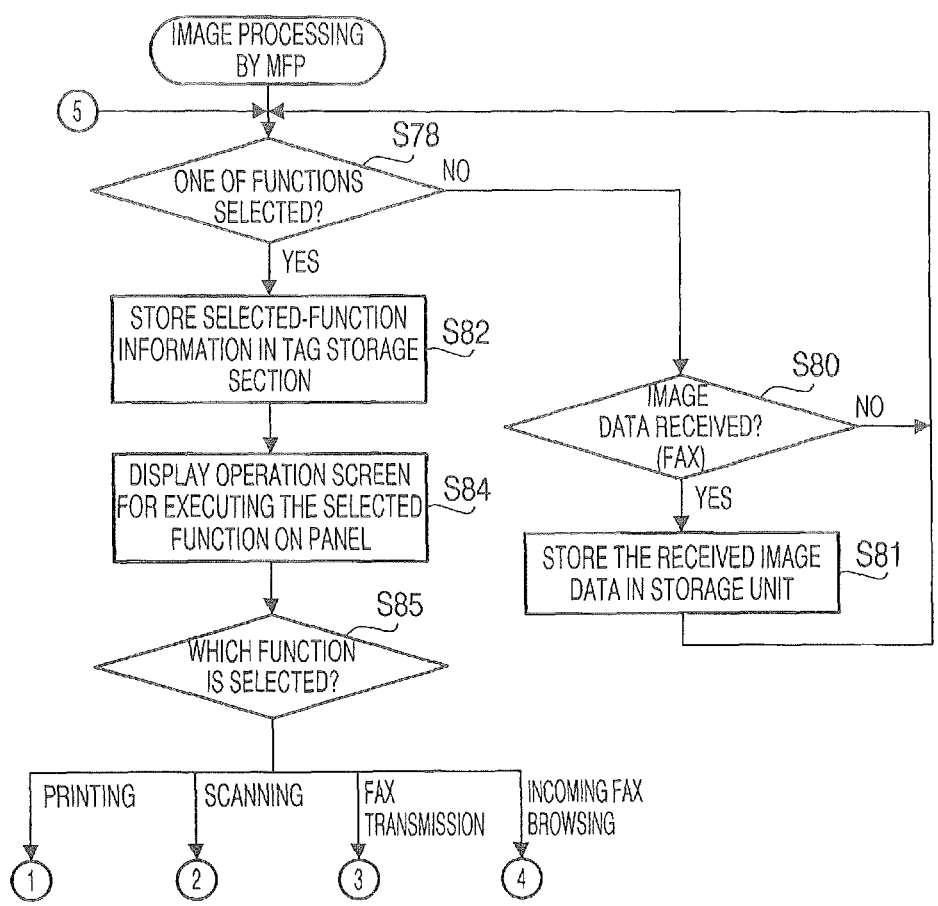
FIGS. 2 to 6 are flowcharts showing a procedure of image processing to be executed by a multi-function peripheral (MFP) in the embodiment according to one or more aspects of the present invention.
Figure 3:
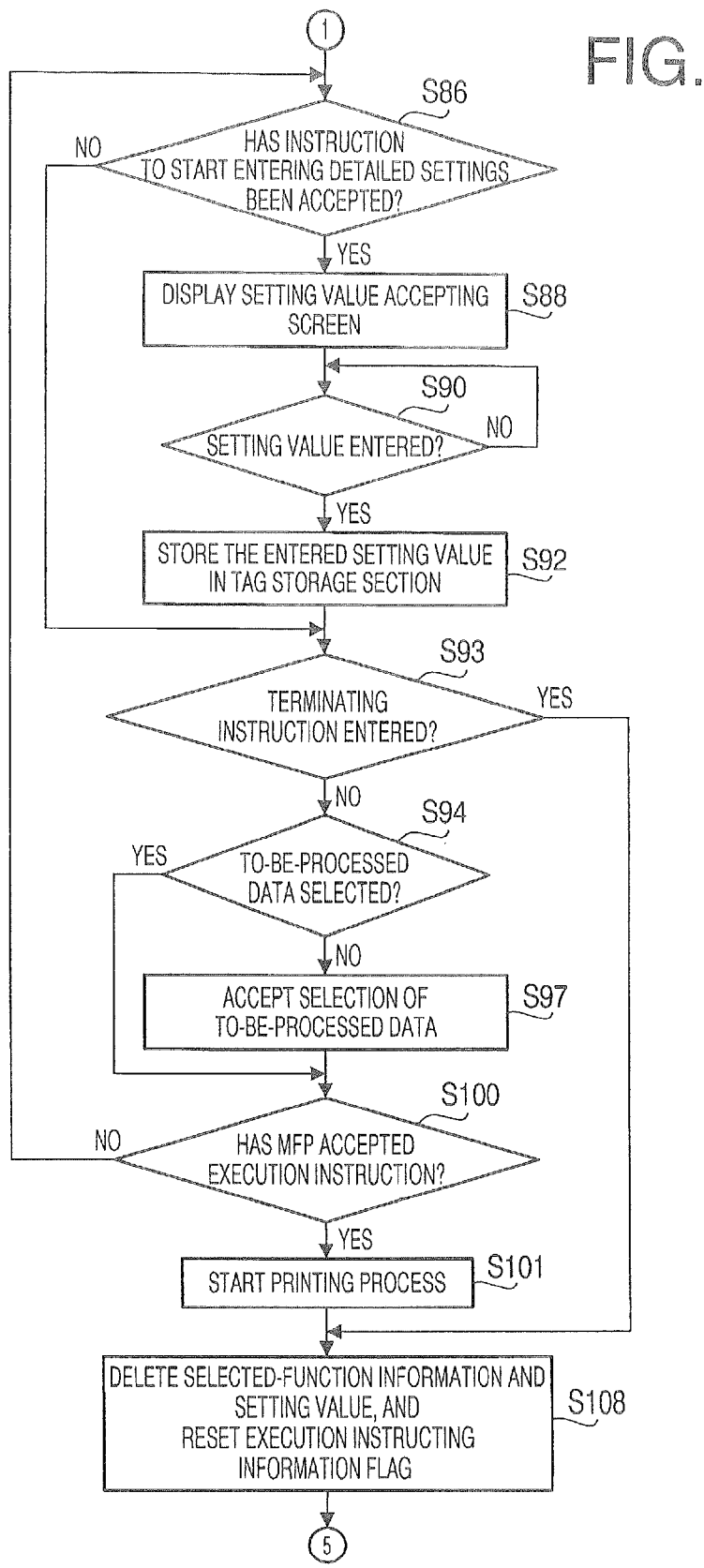

As shown in FIG. 1, a communication system 1 of the embodiment includes a mobile phone 10, a multi-function peripheral (MFP) 51, an access point 62, and a base station 61. Each of the mobile phone 10 and the MFP 51 is configured to serve as a known wireless LAN terminal device. Further, the MFP 51 is configured to perform communication using a telephone line network 100. The access point 62 is configured to serve as a known wireless LAN access point.

The MFP 51 has a plurality of functions such as a facsimile transmission function, an incoming facsimile browsing function, a scanning function, and a printing function. The facsimile transmission function is a function to transmit image data to an external device (not shown) via the telephone line network 100. The incoming facsimile browsing function is a function to receive image data from an external device (not shown) via the telephone line network 100 and output the received image data (the outputting of the received image data may include at least one of displaying and printing the received image data). The scanning function is a function to scan a document sheet by means of a scanner 20 and produce image data. The printing function is a function to print image data on a printing sheet by means of a printer 19.

<Configuration of Mobile Phone>

As shown in FIG. 1, the mobile phone 10 includes a controller 6, a wireless communication unit 15, a wireless antenna unit 16, a button input unit 17, a panel 18, a mobile phone communication unit 22, a mobile phone antenna unit 23, a camera unit 27, and a near field communication (NFC) reader 30. Further, the mobile phone 10 includes a speaker 3 and a microphone 4 in order to perform voice communication and input a sound. The elements included in the mobile phone 10 are configured to communicate with each other via an input-output (I/O) port 7.

The controller 6 includes a central processing unit (CPU) 11 and a storage unit 12. The CPU 11 is configured to execute programs stored in the storage unit 12. The storage unit 12 may be configured with a combination of a random access memory (RAM), a read only memory (RAM), a flash memory, a hard disk drive (HDD), and a buffer memory of the CPU 11. The storage unit 12 is configured to store programs 21. The programs 21 include a control application 26, a printing application 28, a scanning application 28a, a facsimile transmission application 28b, an incoming facsimile browsing application 28c, and an operating system (OS) 29. Additionally, the storage unit 12 is configured to store image data. The image data stored in the storage unit 12 is data acquired by various processes such as a communication process performed between the mobile phone 10 and the MFP 51 and an image-capturing process performed by the camera unit 27.

The OS 29 includes a program for causing the mobile phone communication unit 22 to perform communication, and a program for causing the wireless communication unit 15 to perform wireless LAN communication 201. Further, the OS 29 includes a program that serves an application programming interface (API) for allowing each individual program to obtain information acquired by various kinds of hardware such as the NFC reader 30 or for allowing each individual program to provide instructions to the various kinds of hardware. Further, the control application 26 is configured to cause the MFP 51 to perform various kinds of control (e.g., an operation of launching each individual application) of the printing application 28, the scanning application 28a, the facsimile transmission application 28b, and the incoming facsimile browsing application 28c. Further, the printing application 28 is configured to cause the MFP 51 to perform a below-mentioned printing process. The scanning application 28a is configured to cause the MFP 51 to perform a below-mentioned scanning process. The facsimile transmission application 28b is configured to cause the MFP 51 to perform a below-mentioned facsimile transmission process. The incoming facsimile browsing application 28c is a program for transmitting image data received by the MFP 51 to the mobile phone 10.

The wireless communication unit 15 is configured to perform, via the wireless antenna unit 16, the wireless LAN communication 201 complying with an infrastructure mode (a mode to allow a plurality of wireless LAN communication terminal devices to perform data communication via an access point) of a wireless LAN method (a data communication method via radio waves). Thus, digital signals that form various kinds of data are transmitted and received via the wireless communication unit 15. As an example of the wireless LAN method, cited is a communication method defined by the standard IEEE802.11a/b/g/n. The NFC reader 30 is configured to perform NFC communication 200 with an NFC tag 46. The NFC communication 200 is a near-field-type wireless communication executable within a communication area of an extremely short distance equal to or less than one meter. The NFC communication 200 may include infrared communication and Bluetooth (trademark registered). Establishment of the NFC communication 200 does not need various kinds of communication setting information (such as an IP address and an SSID). Further, the mobile phone communication unit 22 is configured to perform wireless communication 210 complying with a mobile phone communication method (a cellular phone communication method), with the base station 61 via the mobile phone antenna unit 23.

The button input unit 17 is configured to accept operations from a user of the mobile phone 10. The button input unit 17 may be configured as a touch panel integrated with the panel 18. The panel 18 is configured to display various kinds of information as to functions of the mobile phone 10. The camera unit 27 is configured to capture a predetermined range of image, for instance, with a CCD and acquire image data.

<Configuration of MFP>

The MFP 51 includes the printer 19, the scanner 20 a CPU 32, a storage unit 33, a wireless communication unit 36, a wireless antenna unit 37, a button input unit 38, a panel 39, a modem 40, a telephone line connection unit 41, the NFC tag 46, and an indicating lamp 45. The elements included in the MFP 51 are configured to communicate with each other via an input-output (I/O) port 43.

The NFC tag 46 is configured to perform the NFC communication 200 with the NFC reader 30. The NFC tag 46 is provided with a tag storage section 47, which is a non-volatile memory configured to store data to be transmitted from the NFC tag 46 to the NFC reader 30. Specifically, the tag storage section 47 is configured to store selected-function information, communication setting information, and setting values.

The selected-function information indicates which function is selected from the functions of the MFP 51 (such as the facsimile transmission function, the incoming facsimile browsing function, the scanning function, and the printing function). It is noted that the selected function may not necessarily be selected by the user. The communication setting information includes various settings for allowing the mobile phone 10 to establish wireless LAN communication 203 with the wireless communication unit 36 of the MFP 51. For example, the communication setting information may include access point information and an MFP-IP address. For example, the access point information may include an SSID of the access point 62. For example, the MFP-IP address may include an IP address of the MFP 51.

The setting values are various settings regarding the functions of the MFP 51 (e.g., the facsimile transmission function, the incoming facsimile browsing function, the scanning function, and the printing function). For example, the setting values regarding the facsimile transmission function may include a facsimile number of a transmission destination, a document size, a communication speed, and a communication mode (such as a fine mode or a regular mode). For example, the setting values regarding the incoming facsimile browsing function may include identification information of facsimile data to be browsed. For example, the setting values regarding the scanning function may include a resolution, and a file saving format (such as PDF or JPEG). For example, the setting values regarding the printing function may include a size of a printing sheet, a setting as to whether to apply color printing, and a setting as to whether to apply double-side printing.

The CPU 32 is configured to execute programs stored in the storage unit 33. The storage unit 33 may be configured with a combination of a random access memory (RAM), a read only memory (RAM), a flash memory, and a hard disk drive (HDD). The storage unit 33 is configured to store image data, a data list, and an execution instructing information flag. The image data is data acquired by various processes such as a scanning process by the scanner 20 and a facsimile receiving process by the modem 40. The data list is a list of data identification information for identifying each individual image data acquired in the facsimile receiving process and stored in the storage unit 33. The data identification information may include file names of the image data. The execution instructing information flag is a flag for storing information as to whether execution instructing information has been received from the mobile phone 10.

The wireless communication unit 36 is configured to transmit and receive digital signals that form various kinds of data, by performing the wireless LAN communication 203 with the access point 62 via the wireless antenna unit 37. The wireless LAN communication 203 is carried out at a higher communication speed than the communication speed of the NFC communication 200 within a longer communicable distance than the communicable distance of the NFC communication 200.

The button input unit 38 includes keys for executing the functions of the MFP 51. The button input unit 38 may be configured as a touch panel integrated with the panel 39. The panel 39 is configured to display various kinds of information as to the functions of the MFP 51. The printer 19 is configured to perform printing on a printing sheet. The scanner 20 is configured to scan a document sheet and produce image data. The modem 40 is configured to modulate document data, to be transmitted by means of the facsimile function, into signals transmittable via the telephone line network 100, and transmit the modulated signals via the telephone line connection unit 41. Further, the modem 40 is configured to receive signals from the telephone line network 100 via the telephone line connection unit 41 and demodulate the received signals into document data. The indicating lamp 45, which includes a light emitting diode (LED), is configured to provide the user with information on various statuses of the MFP 51.

The mobile phone 10 and the access point 62 are configured to perform the wireless LAN communication 201 complying with the infrastructure mode of the wireless LAN method. Further, the MFP 51 and the access point 62 are configured to perform the wireless LAN communication 203 complying with the infrastructure mode of the wireless LAN method. Therefore, when the mobile phone 10 and the MFP 51 access the access point 62 to achieve a state where the wireless LAN communications 201 and 203 complying with the infrastructure mode of the wireless LAN method are available, the mobile phone 10 and the MFP 51 are allowed to perform data communication therebetween.

Further, the mobile phone 10 and the MFP 51 are configured to perform the NFC communication 200. Therefore, by bringing the mobile phone 10 into close proximity to the MFP 51 (e.g., holding the mobile phone 10 over the MFP 51) to establish the NFC communication 200, it is possible to perform communication of various kinds of information between the mobile phone 10 and the MFP 51.

<Operations of Communication System>

Figure 7:
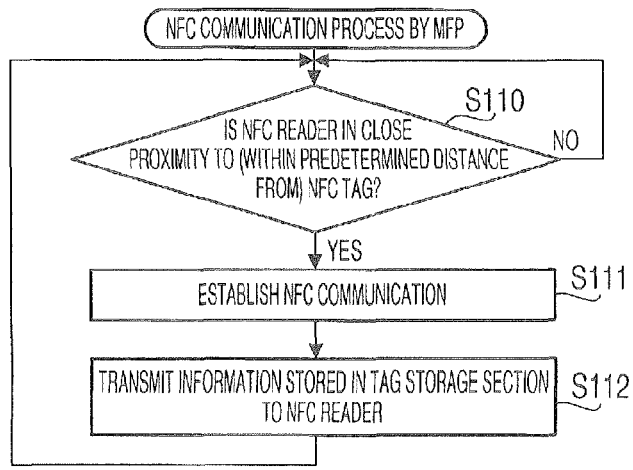
FIG. 7 is a flowchart showing an NFC communication process to be executed by the MFP in the embodiment according to one or more aspects of the present invention.
Figure 8:
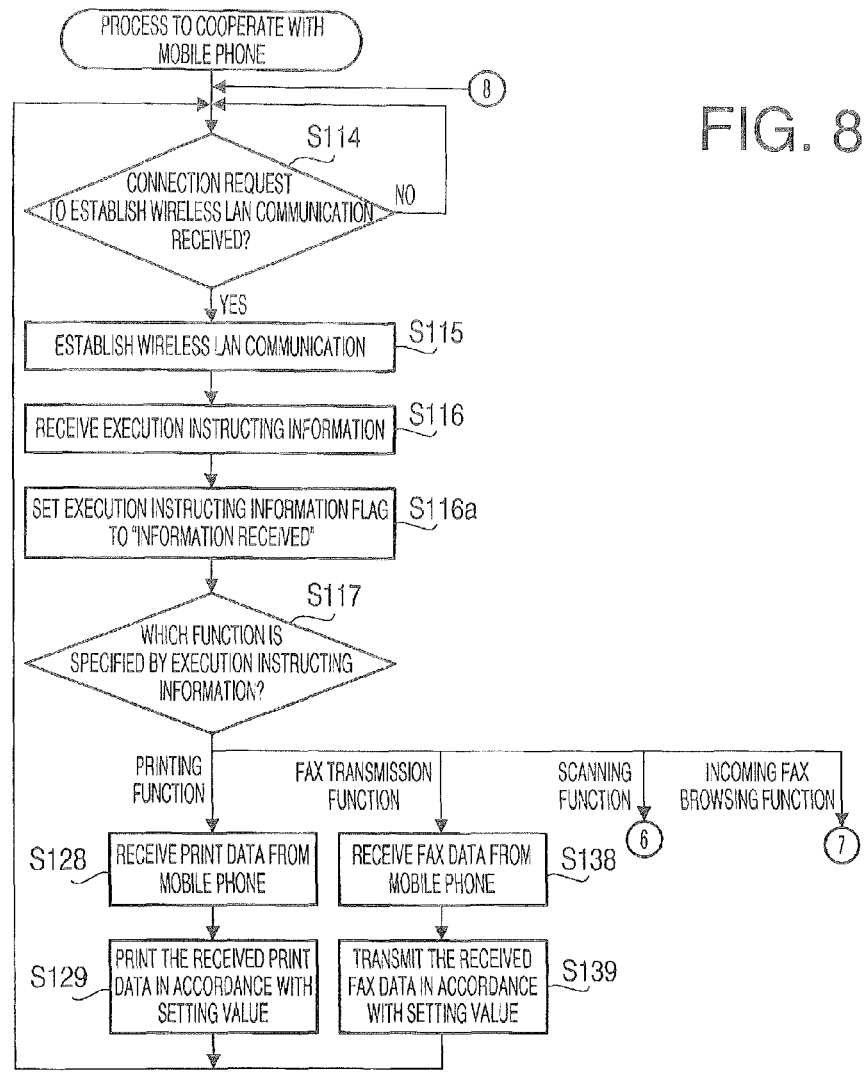
FIGS. 8 to 10 are flowcharts showing a process to be executed by the MFP to cooperate with a mobile phone in the embodiment according to one or more aspects of the present invention.
Figure 9:
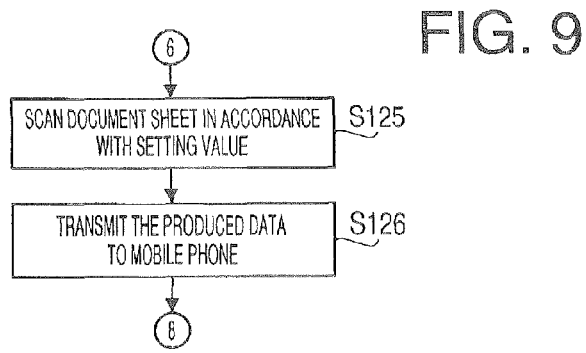
Figure 10:
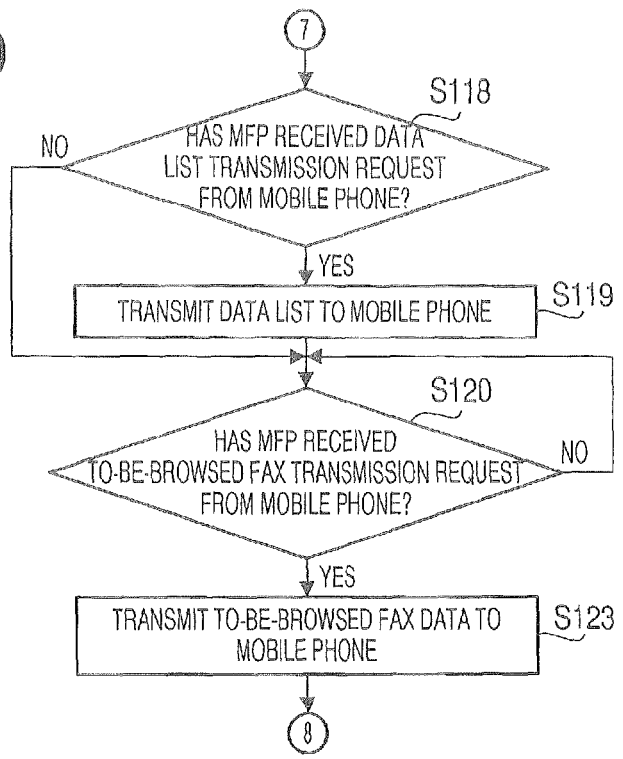
Figure 11:
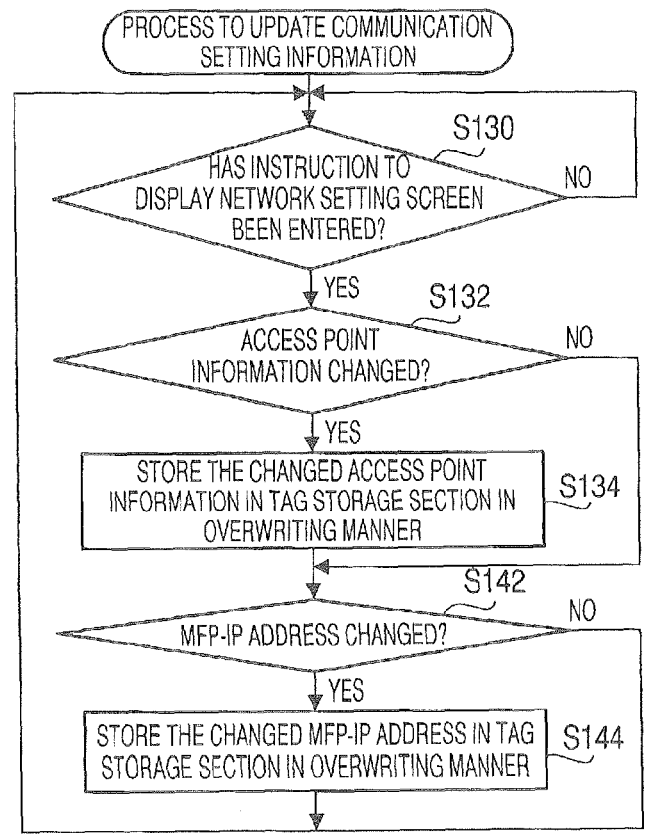
FIG. 11 is a flowchart showing a process to be executed by the MFP to update communication setting information in the embodiment according to one or more aspects of the present invention.
Figure 12:
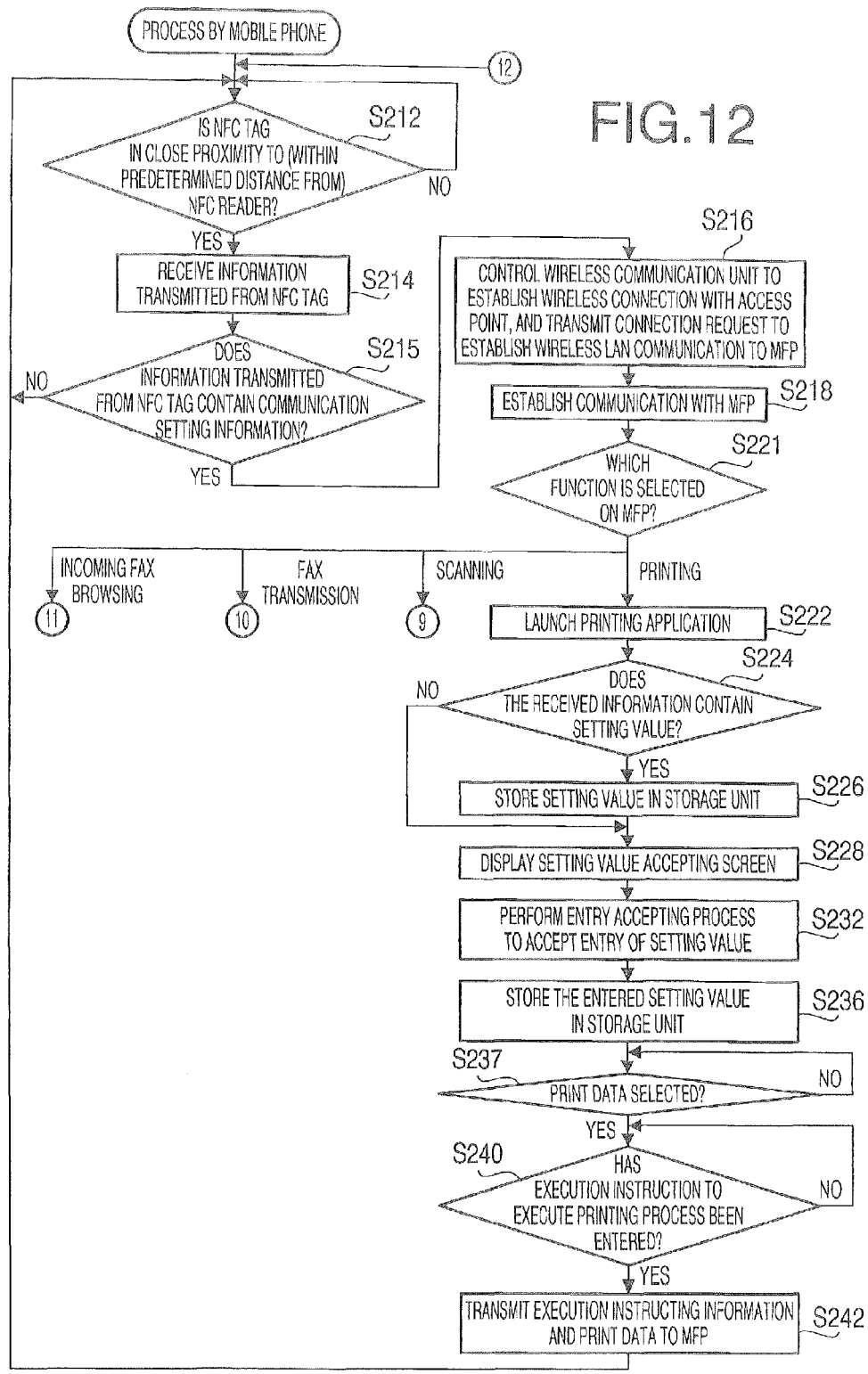
FIGS. 12 to 15 are flowcharts showing a process to be executed by the mobile phone in the embodiment according to one or more aspects of the present invention.
Figure 13:
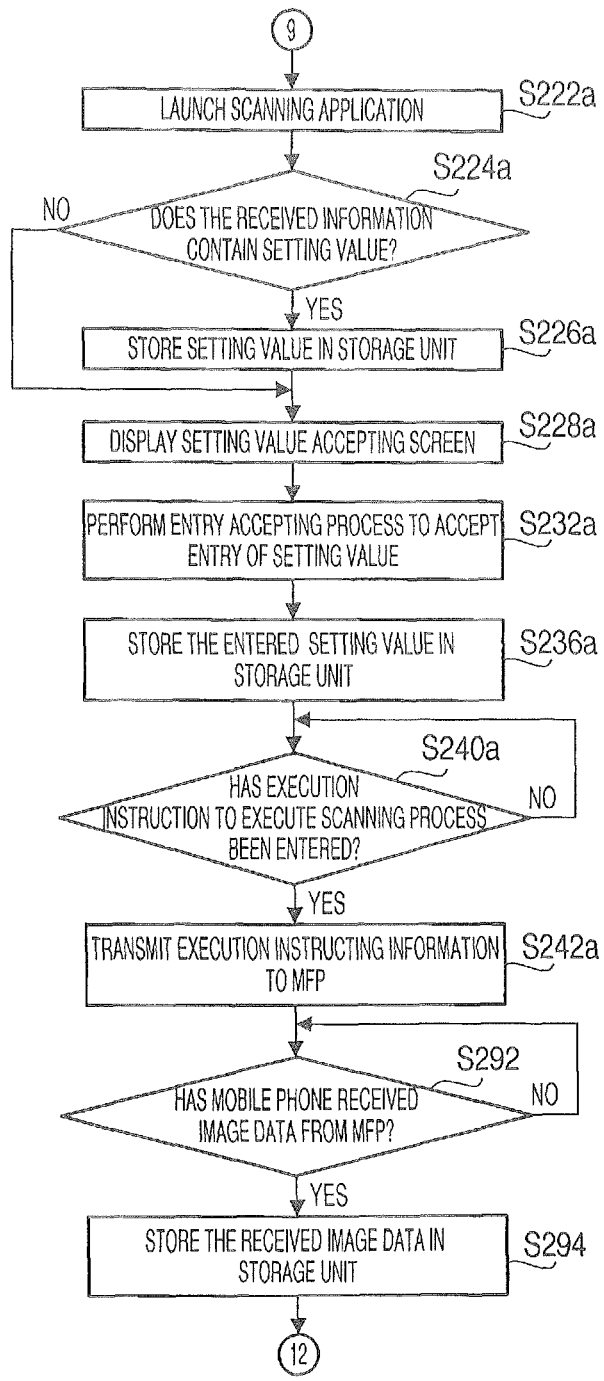
Figure 14:
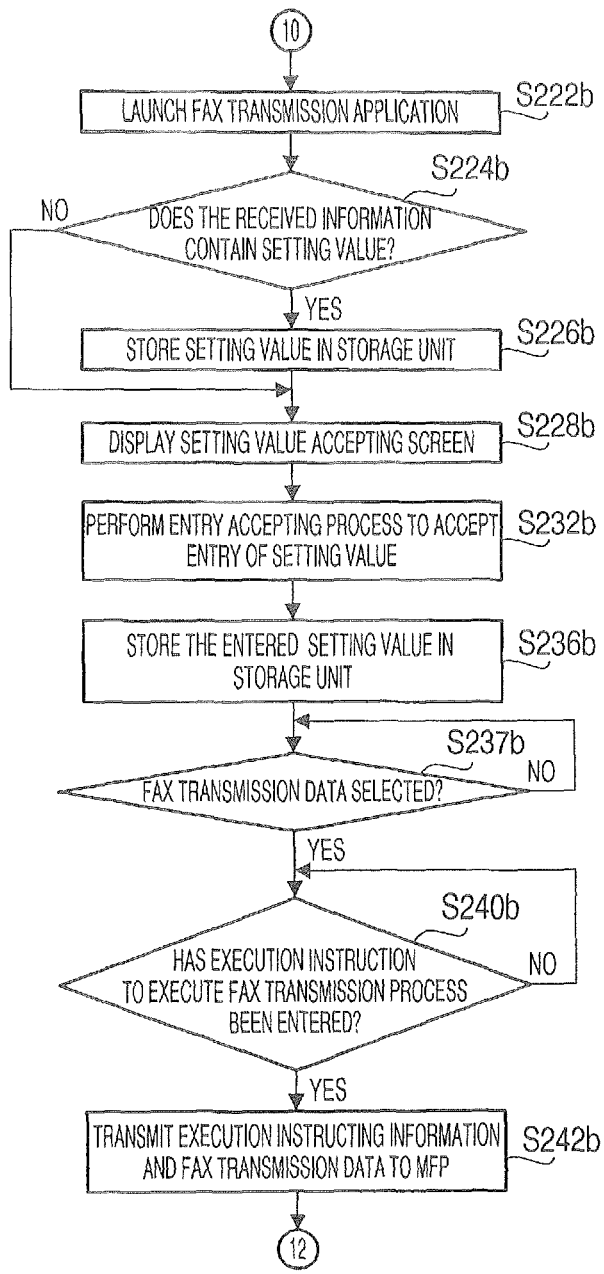
Figure 15:
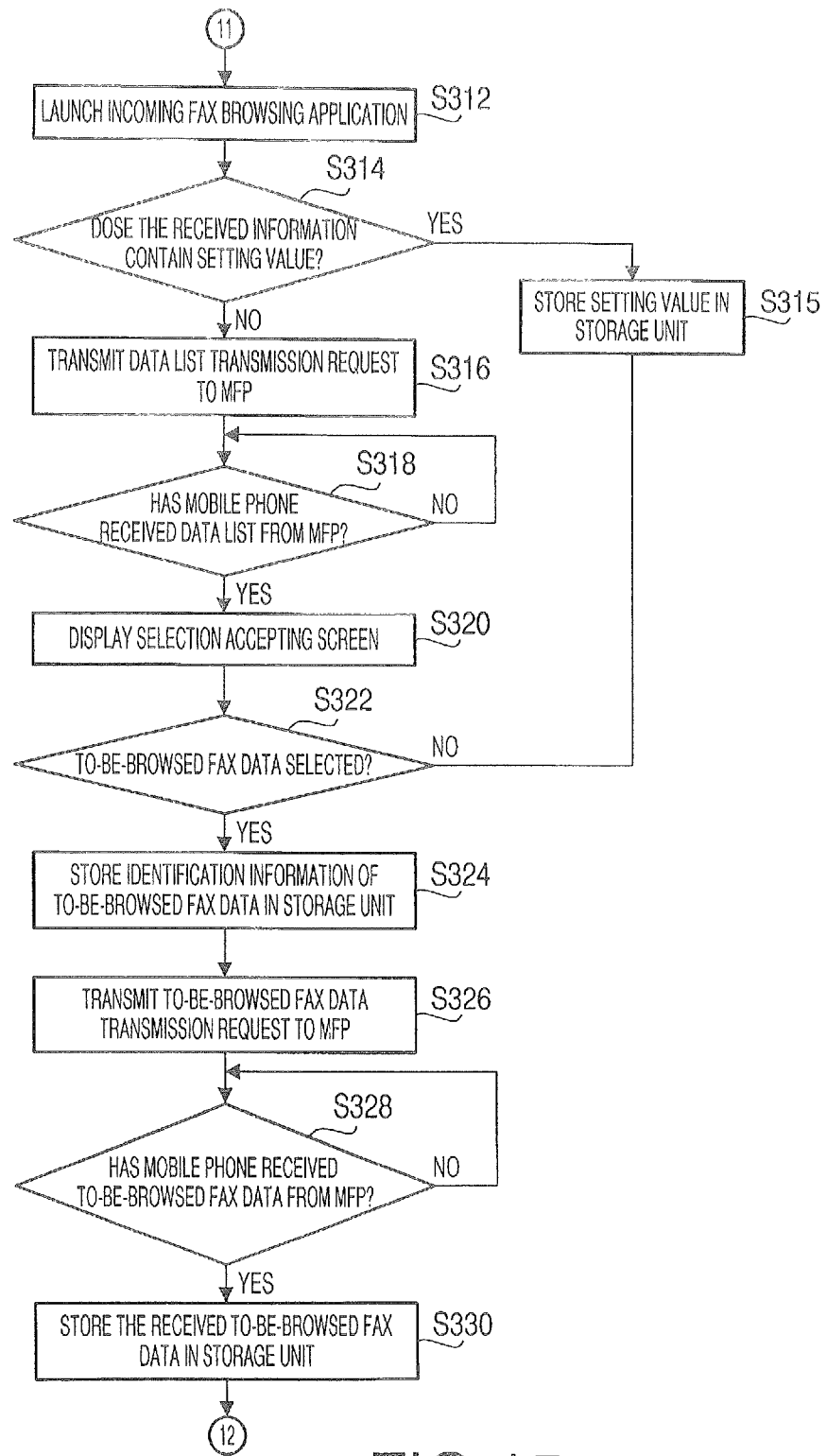

Operations of the communication system 1 of the embodiment will be described with reference to FIGS. 2 to 15. FIGS. 2 to 11 are flowcharts showing processes to be executed by the MFP 51. FIGS. 2 to 6 are flowcharts showing a procedure of image processing. FIG. 7 is a flowchart showing an NFC communication process. FIGS. 8 to 10 are flowcharts showing a process to cooperate with the mobile phone 10. FIG. 11 is a flowchart showing a process to update the communication setting information. The processes shown in FIGS. 7 to 11 are to be executed after interrupting the image processing shown in FIGS. 2 to 6. Namely, each individual process shown in FIGS. 7 to 11 may be launched no matter what step of the process shown in FIGS. 2 to 6 is in execution. FIGS. 12 to 15 are flowcharts showing a process to be executed by the mobile phone 10.

<Operations of MFP>

An explanation will be provided as to the image processing to be performed by the MFP 51, with reference to FIGS. 2 to 6. In S78, the CPU 32 determines whether a function has been selected by the user from the functions of the MFP 51 (e.g., the facsimile transmission function, the incoming facsimile browsing function, the scanning function, and the printing function). For instance, the panel 39 may display thereon icons that represent the functions, respectively, and when the user touches one of the icons, a function corresponding to the touched icon may be selected. When determining that any function has not been selected (S78: No), the CPU 32 goes to S80. In S80, the CPU 32 determines whether the modem 40 has received image data from the telephone line network 100. When determining that the modem 40 has not received image data from the telephone line network 100 (S80: No), the CPU 32 goes back to S78. Meanwhile, When determining that the modem 40 has received image data from the telephone line network 100 (S80: Yes), the CPU 32 goes to S81, in which the CPU 32 stores the received image data in the storage unit 33. Then, the CPU 32 goes back to S78.

Meanwhile, when determining that a function has been selected (S78: Yes), the CPU 32 goes to S82. In S82, the CPU 32 stores, in an overwriting manner, selected-function information corresponding to the selected function in the tag storage section 47 of the NFC tag 46. In S84, the CPU 32 displays, on the panel 39, an operation screen for executing the function selected by the user.

In S85, the CPU 32 begins to perform image processing using the function selected by the user. When the printing function is selected (S85: Printing), the CPU 32 goes to S86 (see FIG. 3).

In S86, the CPU 32 determines whether the MFP 51 (the CPU 32) has accepted an entry starting instruction to start entering detailed settings. For example, the entry starting instruction may be accepted via the button input unit 38. When determining that the MFP 51 has not accepted the entry starting instruction (S86: No), the CPU 32 goes to S93. Meanwhile, when determining that the MFP 51 has accepted the entry starting instruction (S86: Yes), the CPU 32 goes to S88. In S88, the CPU 32 displays a setting value accepting screen on the panel 39. The setting value accepting screen is configured to accept entry of various setting values regarding the function (the printing function) selected in S78.

In S90, the CPU 32 determines whether a setting value has been entered. For example, entry of a setting value may be accepted via the button input unit 38. When determining that any setting value has not been entered (S90: No), the CPU 32 goes back to S90. Meanwhile, when determining that a setting value has been entered (S90: Yes), the CPU 32 goes to S92. In S92, the CPU 32 stores the entered setting value in the tag storage section 47.

In S93, the CPU 32 determines whether a terminating instruction for terminating the image processing (the printing process) on the MFP 51 has been entered. For example, entry of the terminating instruction may be accepted via the button input unit 38. When determining that the terminating instruction has been entered (S93: Yes), the CPU 32 goes to S108. Meanwhile, when determining that the terminating instruction has not been entered (S93: No), the CPU 32 goes to S94.

In S94, the CPU 32 determines whether image data, from the image data stored in the storage unit 33, has been selected as image data to be processed in the printing process (to-be-processed data). When determining that image data, from the stored image data, has been selected as the to-be-processed data (S94: Yes), the CPU 32 goes to S100. Meanwhile, when determining that any image data, from the stored image data, has not been selected as the to-be-processed data (S94: No), the CPU 32 goes to S97. In S97, the CPU 32 accepts the selection of the to-be-processed data. For example, the selection of the to-be-processed data may be made in response to a name of image data being touched by the user on the panel 39 displaying a list of names of the image data stored in the storage unit 33.

In S100, the CPU 32 determines whether the MFP 51 (the CPU 32) has accepted entry of an execution instruction to execute the printing process. For example, the execution instruction to execute the printing process may be accepted via the button input unit 38 of the MFP 51. When determining that the MFP 51 has not accepted entry of the execution instruction to execute the printing process (S100: No), the CPU 32 is in a state awaiting one of receipt of the execution instructing information from the mobile phone 10 (S116) and entry of the execution instruction to execute the printing process (S100: Yes). Therefore, in this case, the CPU 32 goes back to S86.

Meanwhile, When determining that the MFP 51 has accepted entry of the execution instruction to execute the printing process (S100: Yes), the CPU 32 goes to S101. In S101, the CPU 32 starts the printing process. In S108, the CPU 32 deletes the selected-function information (see S82) and the setting value (see S92) stored in the tag storage section 47. Further, the CPU 32 resets, to "No Information Received," the execution instructing information flag stored in the storage unit 33. Then, the CPU 32 goes back to S78 (see FIG. 2).

Figure 4:
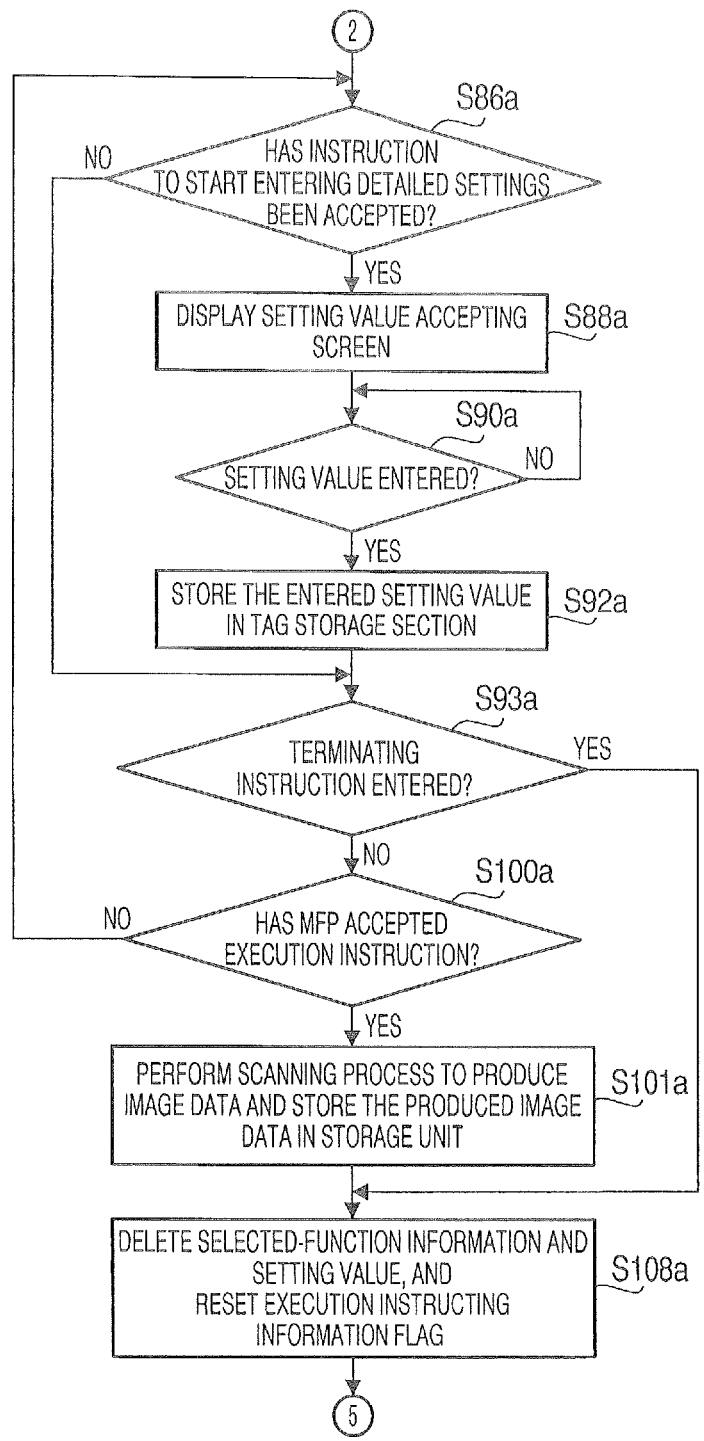

Further, when the scanning function is selected by the user (S85: Scanning), the CPU 32 goes to S86a (see FIG. 4). It is noted that operations in steps S86a to S93a shown in FIG. 4 are the same as those in the aforementioned steps S86 to S93 (see FIG. 3). Therefore, an explanation of the operations in the steps S86a to S93a will be omitted. In S100a, the CPU 32 determines whether the MFP 51 (the CPU 32) has accepted entry of an execution instruction to execute the scanning process. When determining that MFP 51 has not accepted entry of the execution instruction to execute the scanning process (S100a: No), the CPU 32 goes back to S86a. Meanwhile, when determining that MFP 51 has accepted entry of the execution instruction to execute the scanning process (S100a: Yes), the CPU 32 goes to S101a. In S101a, the CPU 32 performs the scanning process to produce image data and store the produced image data in the storage unit 33. Since an operation in S108a is the same as that in the aforementioned step S108 (see FIG. 3), an explanation of the operation in S108a will be omitted. Then, the CPU 32 goes back to S78 (see FIG. 2).

Figure 5:
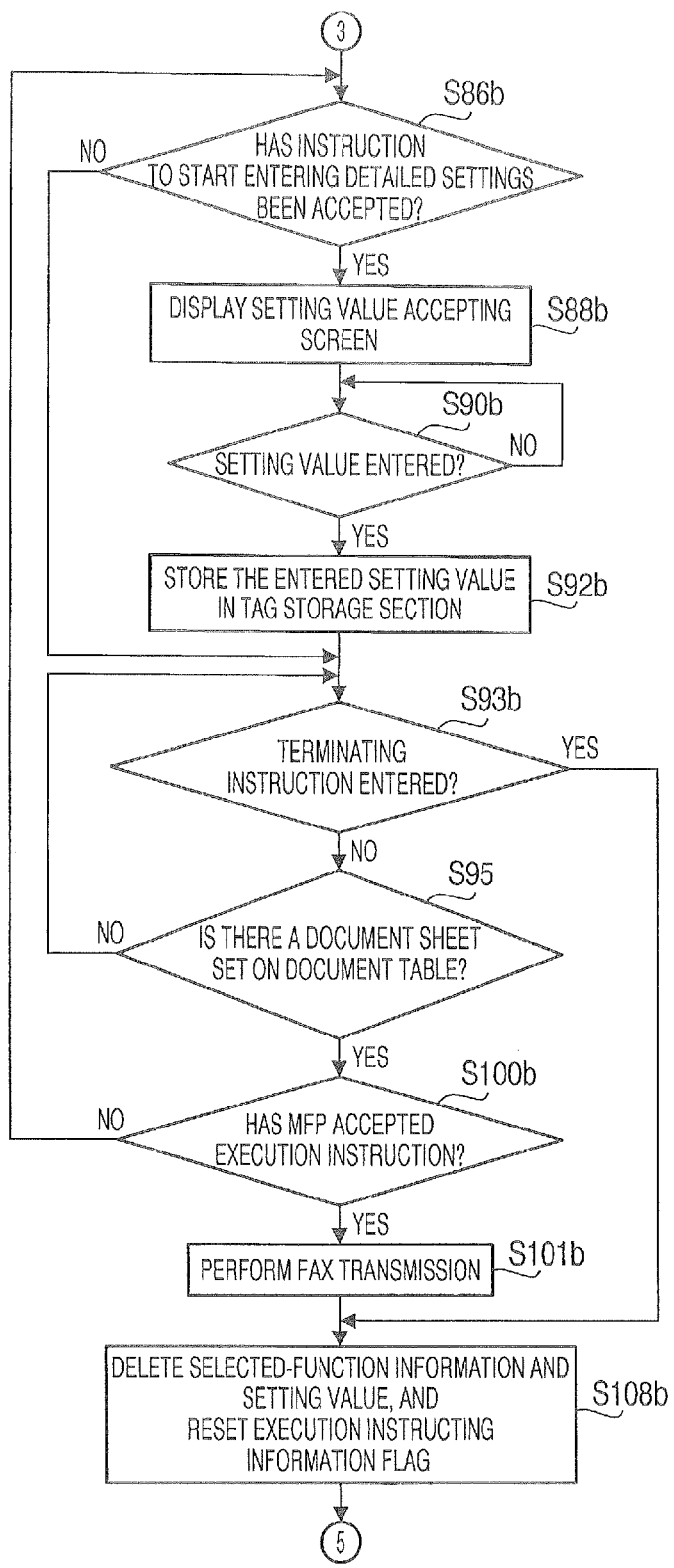
Figure 6:
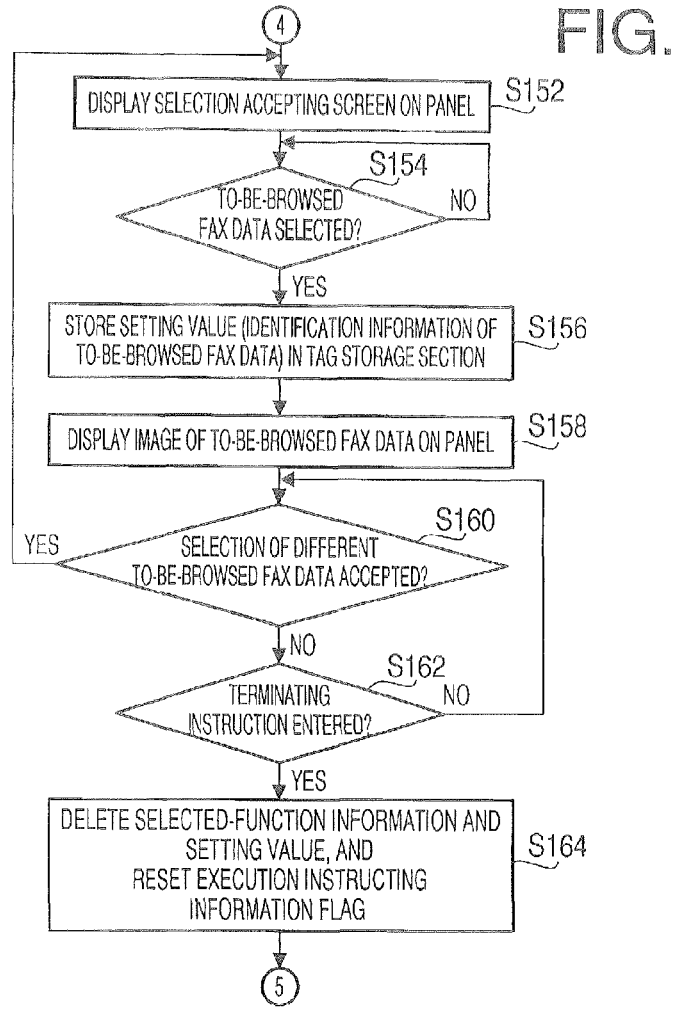

Further, when the facsimile transmission function is selected by the user (S85: FAX Transmission), the CPU 32 goes to S86b (see FIG. 5). It is noted that operations in steps S86b to S93b shown in FIG. 5 are the same as those in the aforementioned steps S86 to S93 (see FIG. 3). Therefore, an explanation of the operations in the steps S86b to S93b will be omitted. In S95, the CPU 32 determines whether there is a document sheet set on a document table of the scanner 20. When determining that there is not a document sheet set on the document table (S95: No), the CPU 32 goes back to S93b. Meanwhile, when determining that there is a document sheet set on the document table (S95: Yes), the CPU 32 goes to S100b. In S100b, the CPU 32 determines whether the MFP 51 (the CPU 32) has accepted entry of an execution instruction to execute the facsimile transmission process. When determining that the MFP 51 has not accepted entry of the execution instruction to execute the facsimile transmission process (S100b: No), the CPU 32 goes back to S86b. Meanwhile, when determining that the MFP 51 has accepted entry of the execution instruction to execute the facsimile transmission process (S100b: Yes), the CPU 32 goes to S101b. In S101b, the CPU 32 performs scanning to produce image data, and performs facsimile transmission of the produced image data via the modem 40 and the telephone line network 100. Since an operation in S108b is the same as that in the aforementioned step S108 (see FIG. 3), an explanation of the operation in S108b will be omitted. Then, the CPU 32 goes back to S78 (see FIG. 2).

Further, when the incoming facsimile browsing function is selected by the user (S85: Incoming FAX Browsing), the CPU 32 goes to S152 (see FIG. 6). In S152, the CPU 32 displays a selection accepting screen on the panel 39. The selection accepting screen is a screen for selecting incoming facsimile data to be browsed (to-be-browsed facsimile data) from image data (incoming facsimile data) acquired in the facsimile receiving process. In S154, the CPU 32 determines whether to-be-browsed facsimile data has been selected. When determining that to-be-browsed facsimile data has not been selected (S154: No), the CPU 32 goes back to S154. Meanwhile, when determining that to-be-browsed facsimile data has been selected (S154: Yes), the CPU 32 goes to S156.

In S156, the CPU 32 stores identification information of the to-be-browsed facsimile data as a setting value in the tag storage section 47. For example, the identification information of the to-be-browsed facsimile data may include a file name of the to-be-browsed facsimile data. In S158, the CPU 32 displays an image of the to-be-browsed facsimile data on the panel 39. Thereby, the user is allowed to browse the image formed based on the to-be-browsed facsimile data. In S160, the CPU 32 determines whether the MFP 51 (the CPU 32) has accepted a selection of different to-be-browsed facsimile data. When determining that the MFP 51 has accepted a selection of different to-be-browsed facsimile data (S160: Yes), the CPU 32 goes back to S152. Meanwhile, when determining that the MFP 51 has not accepted a selection of different to-be-browsed facsimile data (S160: No), the CPU 32 goes to S162.

In S162, the CPU 32 determines whether a terminating instruction to terminate the incoming facsimile browsing process in execution on the MFP 51 has been entered. When determining that the terminating instruction to terminate the incoming facsimile browsing process has not been entered (S162: No), the CPU 32 goes back to S160. Meanwhile, when determining that the terminating instruction to terminate the incoming facsimile browsing process has been entered (S162: Yes), the CPU 32 goes to S164. Since an operation in S164 is the same as that in the aforementioned step S108 (see FIG. 3), an explanation of the operation in S164 will be omitted. Then, the CPU 32 goes back to S78 (see FIG. 2).

Referring to FIG. 7, the NFC communication process to be executed on the MFP 51 will be described. In S110, the CPU 32 determines whether the NFC reader 30 of the mobile phone 10 is in close proximity to (within a predetermined distance from) the NFC tag 46. For example, the predetermined distance may be about 10 cm. When determining that the NFC reader 30 is not in close proximity to (within the predetermined distance from) the NFC tag 46 (S110: No), the CPU 32 goes back to S110. Meanwhile, when determining that the NFC reader 30 is in close proximity to (within the predetermined distance from) the NFC tag 46 (S110: Yes), the CPU 32 goes to S111. In S111, the CPU 32 establishes the NFC communication 200 between the NFC tag 46 and the NFC reader 30.

In S112, the CPU 32 transmits the information stored in the tag storage section 47 from the NFC tag 46 to the NFC reader 30 via the NFC communication 200. Then, the CPU 32 goes back to S110. Here, in the case where the setting value(s) have been entered on the side of the MFP 51 (S90, S90a, S90b, or S154: Yes) at the time when it is detected that the NFC reader 30 is in close proximity to (within the predetermined distance from) the NFC tag 46 (S110: Yes), the tag storage section 47 stores the communication setting information, the selected-function information, and the setting value(s). Hence, the communication setting information, the selected-function information, and the setting value are transmitted from the NFC tag 46 to the NFC reader 30. Thereby, the contents of various setting values entered on the side of the MFP 51 are turned over to the mobile phone 10. Meanwhile, in the case where any setting value has not been entered on the side of the MFP 51 (S86, S86a, S86b, or S154: No) at the time when it is detected that the NFC reader 30 is in close proximity to (within the predetermined distance from) the NFC tag 46 (S110: Yes), the tag storage section 47 stores the communication setting information and the selected-function information, but does not store any setting value. Hence, the communication setting information and the selected-function information are transmitted from the NFC tag 46 to the NFC reader 30. In this case, the mobile phone 10 is in a state having no setting value entered.

Referring to FIG. 8, an explanation will be provided as to the process to cooperate with the mobile phone 10. In S114, the CPU 32 determines whether the MFP 51 (the CPU 32) has received a connection request to establish the wireless LAN communication (see S216). When determining that the MFP 51 has not received the connection request to establish the wireless LAN communication (S114: No), the CPU 32 goes back to S114. Meanwhile, when determining that the MFP 51 has received the connection request to establish the wireless LAN communication (S114: Yes), the CPU 32 goes to S115. In S115, the CPU 32 controls the wireless communication unit 36 to establish the wireless LAN communication 203 using the communication setting information stored in the tag storage section 47.

In S116, the CPU 32 receives the execution instructing information from the mobile phone 10 via the wireless LAN communication 203. The execution instructing information is information for instructing the MFP 51 to execute image processing using a function of the plurality of functions of the MFP 51. Further, the execution instructing information contains a setting value regarding the image processing that the execution instructing information instructs the MFP 51 to execute. In S116a, the CPU 32 sets, to "Information Received," the execution instructing information flag stored in the storage unit 33.

In S117, the CPU 32 begins to execute the image processing using the function specified by the received execution instructing information. When the execution instructing information instructs the MFP 51 to execute the image processing using the printing function (S117: Printing Function), the CPU 32 goes to S128. In S128, the CPU 32 receives print data from the mobile phone 10. In S129, the CPU 32 controls the printer 19 to print the received print data in accordance with the setting value. Then, the CPU 32 goes back to S114.

Meanwhile, when the received execution instructing information instructs the MFP 51 to execute the image processing using the facsimile transmission function (S117: FAX Transmission Function), the CPU 32 goes to S138. In S138, the CPU 32 receives facsimile data from the mobile phone 10. In S139, the CPU 32 controls the modem 40 to transmit the received facsimile data in accordance with the setting value. Then, the CPU 32 goes back to S114.

Further, meanwhile, when the received execution instructing information instructs the MFP 51 to execute the image processing using the scanning function (S117: Scanning Function), the CPU 32 goes to S125 (see FIG. 9). In S125, the CPU 32 performs the scanning process of scanning a document sheet set on the document table of the scanner 20. The scanning process is performed in accordance with the setting value contained in the execution instructing information. In S126, the CPU 32 transmits data produced in the scanning process to the mobile phone 10 via the wireless LAN communication 201 and 203. Then, the CPU 32 goes back to S114 (see FIG. 8).

Further, meanwhile, when the received execution instructing information instructs the MFP 51 to execute the image processing using the incoming facsimile browsing function (S117: Incoming Fax Browsing Function), the CPU 32 goes to S118 (see FIG. 10). In S118, the CPU 32 determines whether the MFP 51 (the CPU 32) has received a data list transmission request from the mobile phone 10. The data list transmission request is a request to transmit a data list of the image data acquired in the facsimile receiving process to the mobile phone 10 via the wireless LAN communication 203. When determining that the MFP 51 has not received the data list transmission request from the mobile phone 10 (S118: No), the CPU 32 goes to S120. Meanwhile, when determining that the MFP 51 has received the data list transmission request from the mobile phone 10 (S118: Yes), the CPU 32 goes to S119. In S119, the CPU 32 reads out the data list from the storage unit 33 and transmits the data list to the mobile phone 10. Then, the CPU 32 goes to S120. The data list contains at least the data identification information of the image data acquired in the facsimile receiving process.

In S120, the CPU 32 determines whether the MFP 51 (the CPU 32) has received a to-be-browsed facsimile transmission request that contains the identification information of the to-be-browsed facsimile data from the mobile phone 10. The to-be-browsed facsimile transmission request is a request to transmit the to-be-browsed facsimile data to the mobile phone 10 via the wireless LAN communication 203. When determining that the MFP 51 has not received the to-be-browsed facsimile transmission request from the mobile phone 10 (S120: No), the CPU 32 goes back to S120. Meanwhile, when determining that the MFP 51 has received the to-be-browsed facsimile transmission request from the mobile phone 10 (S120: Yes), the CPU 32 goes back to S120.

In S123, the CPU 32 transmits the to-be-browsed facsimile data identified by the identification information of the to-be-browsed facsimile data contained in the to-be-browsed facsimile transmission request, to the mobile phone 10 via the wireless LAN communications 201 and 203. Then, the CPU 32 goes back to S114 (see FIG. 8).

Referring to FIG. 11, an explanation will be provided as to a process to update the communication setting information stored in the tag storage section 47. In S130, the CPU 32 determines whether an instruction to display a network setting screen has been entered. The network setting screen is a screen for setting various setting values contained in the communication setting information stored in the tag storage section 47. The instruction to display the network setting screen may be entered, e.g., via the button input unit 38.

In S132, the CPU 32 determines whether the access point information, which is one of the setting values contained in the communication setting information, has been changed. When determining that the access point information has not been changed (S132: No), the CPU 32 goes to S142. Meanwhile, when determining that the access point information has been changed (S132: Yes), the CPU 32 goes to S134. In S134, the CPU 32 stores the changed access point information in the tag storage section 47 in an overwriting manner.

In S142, the CPU 32 determines whether the MFP-IP address, which is one of the setting values contained in the communication setting information, has been changed. When determining that the MFP-IP address has not been changed (S142: No), the CPU 32 goes to S130. Meanwhile, when determining that the MFP-IP address has been changed (S142: Yes), the CPU 32 goes to S144. In S144, the CPU 32 stores the changed MFP-IP address in the tag storage section 47 in an overwriting manner. Then, the CPU 32 goes back to S130.

<Operations of Mobile Phone>

Referring to FIGS. 12 to 15, a process to be executed by the mobile phone 10 will be described. The process shown in the flowcharts of FIGS. 12 to 15 is launched in response to execution of the control application 26 by the CPU 11. In S212, the CPU 11 determines whether the NFC tag 46 of the MFP 51 is in close proximity to (within the predetermined distance from) the NFC reader 30. When determining that the NFC tag 46 is not in close proximity to (within the predetermined distance from) the NFC reader 30 (S212: No), the CPU 11 goes back to S212. Meanwhile, when determining that the NFC tag 46 is in close proximity to (within the predetermined distance from) the NFC reader 30 (S212: Yes), the CPU 11 goes to S214.

In S214, the CPU 11 controls the NFC reader 30 to receive information transmitted from the NFC tag 46 via the NFC communication 200. When the NFC tag 46 is in close proximity to (within the predetermined distance from) the NFC reader 30 in the case where the setting value has been entered on the side of the MFP 51, the information transmitted from the NFC tag 46 contains the communication setting information, the selected-function information, and the setting value. Meanwhile, when the NFC tag 46 is in close proximity to (within the predetermined distance from) the NFC reader 30 in the case where the setting value has not been entered on the side of the MFP 51, the information transmitted from the NFC tag 46 contains the communication setting information and the selected-function information, but does not contain the setting value.

In S215, the CPU 11 determines whether the information transmitted from the NFC tag 46 contains the communication setting information and the selected-function information. When determining that the information transmitted from the NFC tag 46 does not contain the communication setting information or the selected-function information (S215: No), the CPU 11 goes back to S212, determining that it is a case where when the tag storage section 47 does not store the communication setting information or the selected-function information, the NFC tag 46 is brought into close proximity to (within the predetermined distance from) the NFC reader 30, and the NFC communication 200 is performed. Meanwhile, when determining that the information transmitted from the NFC tag 46 contains the communication setting information and the selected-function information (S215: Yes), the CPU 11 goes to S216.

In S216, the CPU 11 controls the wireless communication unit 15 to establish a wireless connection with the access point 62. Further, the CPU 11 transmits a connection request to establish wireless LAN communication, to the MFP 51 via the NFC communication 200. In S218, the CPU 11 establishes communication with the MFP 51 via the wireless LAN communications 201 and 203.

In S221, the CPU 11 determines which function has been selected on the MFP 51, based on the selected-function information. When determining that the printing function has been selected on the MFP 51 (S221: Printing), the CPU 11 goes to S222.

In S222, the CPU 11 launches the printing application 28. In S224, the CPU 11 determines whether the information transmitted from the NFC tag 46 of the MFP 51 contains the setting value. When determining that the information transmitted from the NFC tag 46 does not contain the setting value (S224: No), the CPU 11 goes to S228. Meanwhile, when determining that the information transmitted from the NFC tag 46 contains the setting value (S224: Yes), the CPU 11 goes to S226. In S226, the CPU 11 stores in the storage unit 12 the setting value transmitted from the NFC tag 46.

In S228, the CPU 11 displays a setting value accepting screen on the panel 18. Further, when the setting value stored in S226 exists in the storage unit 12, the CPU 11 displays the setting value on the setting value accepting screen. Thereby, the content of the setting value entered on the side of the MFP 51 is turned over to the mobile phone 10. In S232, the CPU 11 performs an entry accepting process to accept entry of the setting value. In the entry accepting process, the CPU 11 accepts a change of the setting value displayed on the setting value accepting screen, via the button input unit 17. When the setting value is changed, the CPU 11 displays the changed setting value on the setting value accepting screen. Then, in response to accepting entry of an instruction to determine the setting value, the CPU 11 goes to S236. For example, the entry of the instruction to determine the setting value may be accepted via the button input unit 17.

In S236, the CPU 11 stores in the storage unit 12 the setting value entered in S232 (i.e., the setting value displayed on the setting value accepting screen). Thereby, it is possible to enter a new setting value and update a previously-entered setting value.

In S237, the CPU 11 determines whether image data (print data) to be printed has been selected from the image data stored in the storage unit 12. When determining that the print data has not been selected (S237: No), the CPU 11 goes back to S237. Meanwhile, when determining that the print data has been selected (S237: Yes), the CPU 11 goes to S240.

In S240, the CPU 11 determines whether the mobile phone 10 (the CPU 11) has accepted entry of an execution instruction to execute the printing process. For example, the entry of the execution instruction to execute the printing process may be accepted via the button input unit 17 of the mobile phone 10. When determining that the mobile phone 10 has not accepted entry of the execution instruction to execute the printing process (S240: No), the CPU 11 goes back to S240. Meanwhile, when determining that the mobile phone 10 has accepted entry of the execution instruction to execute the printing process (S240: Yes), the CPU 11 goes to S242.

In S242, the CPU 11 produces the execution instructing information for executing the printing process. The execution instructing information is produced to incorporate therein the setting value stored in the storage unit 12. Then, the CPU 11 transmits the produced execution instructing information and the print data selected in S237 to the MFP 51 via the wireless LAN communications 201 and 203. Afterward, the CPU 11 goes back to S212.

Further, when determining that the scanning function has been selected on the MFP 51 (S221: Scanning), the CPU 11 goes to S222*a* (see FIG. 13). In S222*a*, the CPU 11 launches the scanning application 28*a*. Since operations in S224*a* to S236*a* are the same as those in the aforementioned steps S224 to S236 (see FIG. 12), explanations of the operations in S224*a* to S236*a* will be omitted. In S240*a*, the CPU 11 determines whether the mobile phone 10 (the CPU 11) has accepted entry of an execution instruction to execute the scanning process. When determining that the mobile phone 10 has not accepted entry of the execution instruction to execute the scanning process (S240*a*: No), the CPU 11 goes back to S240*a*. Meanwhile, when determining that the mobile phone 10 has accepted entry of the execution instruction to execute the scanning process (S240*a*: Yes), the CPU 11 goes to S242*a*.

In S242*a*, the CPU 11 produces the execution instructing information for executing the scanning process. The execution instructing information is produced with the setting value stored in the storage unit 12 being incorporated therein. Then, the CPU 11 transmits the produced execution instructing information to the MFP 51 via the wireless LAN communications 201 and 203. In S292, the CPU 11 determines whether the mobile phone 10 (the CPU 11) has received the image data produced in the scanning process from the MFP 51 via the wireless LAN communications 201 and 203. When determining that the mobile phone 10 has not received the image data produced in the scanning process from the MFP 51 via the wireless LAN communications 201 and 203 (S292: No), the CPU 11 goes back to S292. Meanwhile, when determining that the mobile phone 10 has received the image data produced in the scanning process from the MFP 51 via the wireless LAN communications 201 and 203 (S292: Yes), the CPU 11 goes back to S294. Then, the CPU 11 goes back to S212 (see FIG. 12).

Further, when determining that the facsimile transmission function has been selected on the MFP 51 (S221: FAX Transmission), the CPU 11 goes to S222*b* (see FIG. 14). In S222b, the CPU 11 launches the facsimile transmission 28b. Since operations in S224b to S236b are the same as those in the aforementioned steps S224 to S236 (see FIG. 12), explanations of the operations in S224b to S236b will be omitted. In S237b, the CPU 11 determines whether image data (facsimile transmission data) to be transmitted via facsimile to the MFP 51 has been selected from the image data stored in the storage unit 12. When determining that the facsimile transmission data has not been selected (S237b: No), the CPU 11 goes back to S237b. Meanwhile, when determining that the facsimile transmission data has been selected (S237b: Yes), the CPU 11 goes to S240b.

In S240b, the CPU 11 determines whether the mobile phone 10 (the CPU 11) has accepted entry of an execution instruction to execute the facsimile transmission process. For example, the entry of the execution instruction to execute the facsimile transmission process may be accepted via the button input unit 17 of the mobile phone 10. When determining that the mobile phone 10 has not accepted entry of the execution instruction to execute the facsimile transmission process (S240b: No), the CPU 11 goes back to S240b. Meanwhile, when determining that the mobile phone 10 has accepted entry of the execution instruction to execute the facsimile transmission process (S240b: Yes), the CPU 11 goes to S242b. In S242b, the CPU 11 produces the execution instructing information for executing the facsimile transmission process. The execution instructing information is produced with the setting value (e.g., a facsimile number of a transmission destination) stored in the storage unit 12 being incorporated therein. Then, the CPU 11 transmits the produced execution instructing information and the facsimile transmission data selected in S237b to the MFP 51 via the wireless LAN communications 201 and 203. Thereafter, the CPU 11 goes back to S212 (see FIG. 12).

Further, when determining that the incoming facsimile browsing function has been selected on the MFP 51 (S221: Incoming FAX Browsing), the CPU 11 goes to S312 (see FIG. 15). In S312, the CPU 11 launches the incoming facsimile browsing application 28c. In S314, the CPU 11 determines whether the information transmitted from the NFC tag 46 of the MFP 51 contains the setting value (the identification information of the to-be-browsed facsimile data). When determining that the information transmitted from the NFC tag 46 contains the setting value (the identification information of the to-be-browsed facsimile data) (S314: Yes), the CPU 11 goes to S315. In S315, the CPU 11 stores in the storage unit 12 the received setting value (the identification information of the to-be-browsed facsimile data). Then, the CPU 11 goes to S326. Meanwhile, when determining that the information transmitted from the NFC tag 46 does not contain the setting value (the identification information of the to-be-browsed facsimile data) (S314: No), the CPU 11 goes to S316. In S316, the CPU 11 transmits the data list transmission request to the MFP 51 via the wireless LAN communications 201 and 203. In S318, the CPU 11 determines whether the mobile phone 10 (the CPU 11) has received the data list from the MFP 51. When determining that the mobile phone 10 has not received the data list from the MFP 51 (S318: No), the CPU 11 goes back to S318. Meanwhile, when determining that the mobile phone 10 has received the data list from the MFP 51 (S318: Yes), the CPU 11 goes to S320.

In S320, the CPU 11 displays a selection accepting screen on the panel 18. Further, when the setting value (the identification information of the to-be-browsed facsimile data) stored in S315 exists in the storage unit 12, the CPU 11 displays, on the selection accepting screen, the to-be-browsed facsimile data identified by the setting value. Thereby, the selection of the to-be-browsed facsimile data made on the MFP 51 is turned over to the mobile phone 10. In S322, the CPU 11 determines whether the to-be-browsed facsimile data has been selected. When determining that the to-be-browsed facsimile data has not been selected (S322: No), the CPU 11 goes back to S322. Meanwhile, when determining that the to-be-browsed facsimile data has been selected (S322: Yes), the CPU 11 goes to S324. In S324, the CPU 11 stores in the storage unit 12 the identification information of the to-be-browsed facsimile data. Thereby, it is possible to select new to-be-browsed facsimile data and change previously selected to-be-browsed facsimile data.

In S326, the CPU 11 transmits to the MFP 51 the to-be-browsed facsimile transmission request that contains the identification information of the to-be-browsed facsimile data. In S328, the CPU 11 determines whether the mobile phone 10 (the CPU 11) has received the to-be-browsed facsimile data from the MFP 51 via the wireless LAN communications 201 and 203. When determining that the mobile phone 10 has not received the to-be-browsed facsimile data from the MFP 51 via the wireless LAN communications 201 and 203 (S328: No), the CPU 11 goes back to S328. Meanwhile, when determining that the mobile phone 10 has received the to-be-browsed facsimile data from the MFP 51 via the wireless LAN communications 201 and 203 (S328: Yes), the CPU 11 goes to S330. In S330, the CPU 11 stores in the storage unit 12 the received to-be-browsed facsimile data. Then, the CPU 11 goes back to S212 (see FIG. 12).

<Advantageous Effects>

An explanation will be provided as to advantageous effects of the communication system 1 configured as above in the embodiment. By bringing the mobile phone 10 having the NFC reader 30 into close proximity to (e.g., within a predetermined distance of 10 cm from) the NFC tag 46 (S110: Yes, and S212: Yes), it is possible to provide the mobile phone 10 with information as to what kind of image processing is in execution on the MFP 51 at the time when establishment of the NFC communication 200 is started (S112). Further, it is possible to receive from the mobile phone 10 the execution instructing information corresponding to the kind of the image processing (S116). Therefore, it is possible to omit an operation of confirming the kind of the image processing in execution on the MFP 51. Thus, it is possible to operate the communication system 1 (the mobile phone 10 and the MFP 51) in an intuitive manner and enhance user-friendliness of the communication system 1.

By informing the mobile phone 10 of the kind of the image processing in execution on the MFP 51 (S112) at the time when establishment of the NFC communication 200 is started (S110: Yes, and S212: Yes), the mobile phone 10 is allowed to launch an application corresponding to the function selected on the MFP 51 (S222, S222a, S222b, and S312). For example, when the printing function is selected as a function to be executed on the MFP 51 (S78), the mobile phone 10 is allowed to determine that the printing function is selected on the MFP 51, using the selected-function information (S221: Printing). Further, the mobile phone 10 is allowed to automatically launch the application (the printing application 28) corresponding to the function selected on the MFP 51 (S222). Thus, it is possible to omit an operation of selecting the application to be executed on the mobile phone 10 and operate the communication system 1 (the mobile phone 10 and the MFP 51) in an intuitive manner.

The communicable distance of the NFC communication 200 is shorter than that of the wireless LAN communication 203. Thereby, even when there are a plurality of MFPs, it is possible to select an intended one of the plurality of MFPs as a communication party by bringing the mobile phone 10 into close proximity to (within the predetermined distance from) the intended MFP. Thus, by using the NFC communication 200, an intuitive operation of holding the mobile phone 10 over the intended MFP makes it possible to specify the intended MFP.

The communication speed of the wireless LAN communications 201 and 203 is faster than that of the NFC communication 200. Further, communication of the image data is performed via the wireless LAN communications 201 and 203 (S123, S126, S128, and S138). Thereby, it is possible to achieve faster communication of the image data than communication of the image data via the NFC communication 200. Thus, it is possible to shorten a time taken for the communication of the image data.

When the setting value has been entered on the side of the MFP 51 (S90, S90a, S90b, and S154: Yes) at the time when establishment of the NFC communication 200 is started (S110: Yes, and S212: Yes), the mobile phone 10 is allowed to acquire the setting value (S214). Therefore, the content of the setting value entered on the MFP 51 is turned over to the mobile phone 10. Thereby, it is possible to omit an operation of reentering on the mobile phone 10 the setting value entered on the MFP 51 and enhance user-friendliness of the communication system 1.

Hereinabove, the embodiment according to aspects of the present invention has been described. The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without reapportioning to the details specifically set forth. In other instances, well known processing structures have not been described in detail, in order not to unnecessarily obscure the present invention.

Only an exemplary embodiment of the present invention and but a few examples of their versatility are shown and described in the present disclosure. It is to be understood that the present invention is capable of use in various other combinations and environments and is capable of changes or modifications within the scope of the inventive concept as expressed herein. For example, the following modifications are possible. It is noted that, in the following modifications, explanations of the same configurations as exemplified in the aforementioned embodiment will be omitted.

[Modifications]

In the aforementioned embodiment, the communication system 1 is exemplified that uses the two types of communication paths, i.e., the NFC communication 200 and the wireless LAN communications 201 and 203. However, aspects of the present invention may be applied to a communication system 1 using only the one type of communication path, i.e., the wireless LAN communications 201 and 203. In this case, in S110, the CPU 32 may determine whether connection of the wireless LAN communications 201 and 203 is started. Further, in S112, the CPU 32 may transmit the communication setting information, the selected-function information, and the setting value to the mobile phone 10 via the wireless LAN communications 201 and 203.

The CPU 32 of the MFP 51 may be configured to monitor whether the MFP 51 (the CPU 32) has received the execution instructing information from the mobile phone 10. For example, the CPU 32 may be configured to perform a monitoring process to monitor whether the MFP 51 (the CPU 32) has received the execution instructing information from the mobile phone 10, in parallel with the printing process (see FIG. 3), the scanning process (see FIG. 4), or the facsimile transmission process (see FIG. 5). The determination as to whether the MFP 51 has received the execution instructing information may be made based on whether the execution instructing information flag read out from the storage unit 33 has the value "Information Received." When the MFP 51 has received the execution instructing information from the mobile phone 10, the printing process is performed based on the execution instructing information. Namely, in this case, it is determined that the printing instruction does not have to be entered on the MFP 51. Thus, in the case, the CPU 32 may be configured to delete the selected-function information (see S82) and the setting value (see S92, S92a, or S92b) stored in the tag storage section 47 and reset to "No Information Received" the execution instructing information flag stored in the storage unit 33.

In the aforementioned embodiment, the mobile phone 10 is configured to perform the wireless LAN communication 201 with the access point 62. However, the mobile phone 10 may be configured to perform wired communication with the access point 62, for instance, via a LAN cable. In this case, the mobile phone 10 may be configured to establish communication with the MFP 51 even without receiving any information on the SSID of the access point 62. Hence, the communication setting information (see S112) to be transmitted from the MFP 51 to the mobile phone 10 via the NFC communication 200 may contain at least the IP address of the MFP 51.

In the aforementioned embodiment, the receipt of the to-be-browsed facsimile transmission request (see S120), the receipt of the data list transmission request (see S118), and the transmission of the data list (see S119) are carried out via the wireless LAN communication 203. However, the receipt of the to-be-browsed facsimile transmission request, the receipt of the data list transmission request, and transmission of the data list may be implemented via the NFC communication 200.

In the aforementioned embodiment, the communication for achieving the facsimile transmission function and the incoming facsimile browsing function is performed via the telephone line network 100. However, the communication for achieving the facsimile transmission function and the incoming facsimile browsing function may be performed via an Internet (not shown).

The mobile phone 10 and the MFP 51 may be configured to perform wireless LAN communication in an ad-hoc mode without having to involving the access point 62.

Further, instead of the mobile phone 10, a device having a communication function (e.g., a notebook computer) may be employed. In this case, the printing application 28, the scanning application 28a, the facsimile transmission application 28b, and the incoming facsimile browsing application 28c may be included in various kinds of driver software installed in the notebook computer.

There may be one or more MFPs each having an NFC tag, in addition to the MFP 51 exemplified in the aforementioned embodiment.

What is claimed is:

1. An image processing apparatus comprising:
a plurality of image processing executing devices each configured to execute a corresponding one of a plurality of image processing operations, the plurality of image processing executing devices comprising a scanning device configured to execute a scanning operation to scan an image on a document sheet and a printing device configured to execute a printing operation to print based on image data;
a user interface, comprising an input unit of a panel, the user interface configured to, when operated by a user, select a specific image processing operation to be executed from among the plurality of image processing operations;
a tag storage readable by an external terminal device via wireless communication;
a controller configured to, in response to the user interface being operated by the user, store selection information indicating that the specific image processing operation is selected from among the plurality of image processing operations, into the tag storage and further, in response to the user interface being operated by the user, configure the image processing apparatus to execute the selected image processing operation,
wherein in response to the external terminal device being within a predetermined distance from the tag storage in a state where the selection information is stored in the tag storage and the image processing apparatus has been configured to execute the selected image processing operation, after the user interface has been operated by the user, the selection information stored in the tag storage is read by the external terminal device via the wireless communication,
wherein the image processing apparatus comprises a wireless antenna configured to execute the wireless communication,
wherein the tag storage is configured to store communication setting information, the communication setting information being used to establish communication with the external terminal device,
wherein in response to the external device being within a predetermined distance from the tag storage in a state where the specific image processing operation has been selected with the user interface, the selection information and the communication setting information are read by the external terminal device via the wireless communication,
wherein after the selection information and the communication setting information are read by the external device, the wireless antenna communicates with the external terminal device,
wherein the controller is further configured to:
control the wireless antenna to receive, from the external terminal device, execution instructing information for instructing the image processing apparatus to execute the selected specific image processing operation; and
control a specific one of the plurality of image processing executing devices that corresponds to the selected specific image processing operation to execute the selected specific image processing operation.

2. The image processing apparatus according to claim 1,
wherein the plurality of image processing executing devices comprise a facsimile device configured to execute a facsimile operation to transmit an image via a telephone line network.

3. The image processing apparatus according to claim 1,
wherein the controller is further configured to, in response to the user interface selection, display on the panel an operation screen for the selected specific image processing operation.

4. The image processing apparatus according to claim 3,
wherein the controller is further configured to display a setting value accepting screen for accepting a setting value for the selected image processing operation.

5. The image processing apparatus according to claim 4,
wherein the controller is further configured to, in response to the setting value being accepted via the setting value accepting screen, store the accepted setting value into the tag storage.

6. The image processing apparatus according to claim 1,
wherein the tag storage is configured to store data in a manner readable via near field wireless communication (NFC), and
wherein the selection information is read by the external terminal device via near field communication (NFC) when within the predetermined distance.

7. The image processing apparatus according to claim 1,
wherein the plurality of image processing executing devices comprise a facsimile device configured to receive an image via a telephone line and output the received image.

8. The image processing apparatus according to claim 1,
wherein the wireless antenna communicates with the external terminal device via an access point.

* * * * *